Figure 1:
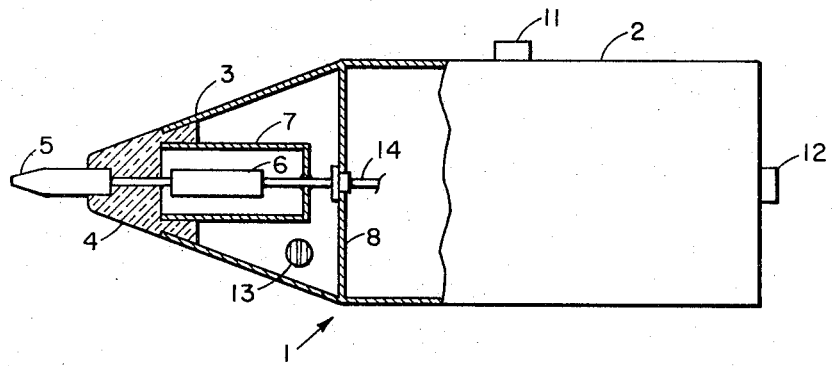

United States Patent [19]

Johnson

[11] 3,863,149

[45] Jan. 28, 1975

[54] RF HAZARD DETECTOR

[75] Inventor: Leo D. Johnson, Kensington, Md.

[73] Assignee: The United States of America as represented by the Secretary of the Navy, Washington, D.C.

[22] Filed: Oct. 30, 1973

[21] Appl. No.: 410,921

[52] U.S. Cl. .............................. 324/72.5, 324/133
[51] Int. Cl. ..................... G01r 31/02, G01r 19/14
[58] Field of Search ................. 324/72.5, 149, 133

[56] References Cited
UNITED STATES PATENTS
2,640,093  5/1953  Herold ........................ 324/149 X
3,452,277  6/1969  Woroble ....................... 324/72.5

FOREIGN PATENTS OR APPLICATIONS
1,199,016  7/1970  Great Britain ................. 324/72.5

OTHER PUBLICATIONS

Textronic Type PR500CF Probe, Oct. 1956.

Primary Examiner—Alfred E. Smith
Assistant Examiner—Rolf Hille
Attorney, Agent, or Firm—R. S. Sciascia; L. I. Shrago

[57] ABSTRACT

A hand-held tester for determining whether an object that is being irradiated with radio frequency energy is at a dangerously high induced radio frequency voltage level. The tester has a high impedance probe, and when this probe is brought in contact with such an object, the radio frequency flow, which takes place through it and the tester, develops a signal which is compared to a reference voltage. When this voltage is exceeded by a predetermined amount, a warning light source is operated.

4 Claims, 2 Drawing Figures

PATENTED JAN 28 1975                3,863,149

RF HAZARD DETECTOR

The present invention relates generally to apparatus for detecting the existence of induced radio frequency voltages and, more particularly, to a portable hand-held detector for indicating whether or not such voltages are at hazardous levels.

Dangerous levels of radio frequency voltage may be present on isolated conductors and metallic structures as a result of their irradiation with high-power radio frequency energy. For example, on shipboard, ungrounded cables and rigging in the vicinity of high-power transmitting antennas may be induced radio frequency voltage levels which may cause injury to personnel when contacted. This potential source of injury is usually unrecognized because of its uncommon nature.

It is, accordingly, a primary object of the present invention to provide a detector for indicating the presence of dangerous levels of radio frequency voltage on conducting elements.

Another object of the present invention is to provide a portable hand-held radio frequency burn hazard detector which is simple to operate and can readily alert personnel to the existence of hazardous RF voltages.

Another object of the present invention is to provide an RF burn hazard detector for probing structures and indicating whether there is any radio frequency voltage thereon exceeding a preset threshold level.

Another object of the present invention is to provide a hand-held RF burn hazard detector which gives a measure of the hazard condition while protecting the tester.

Figure 2:
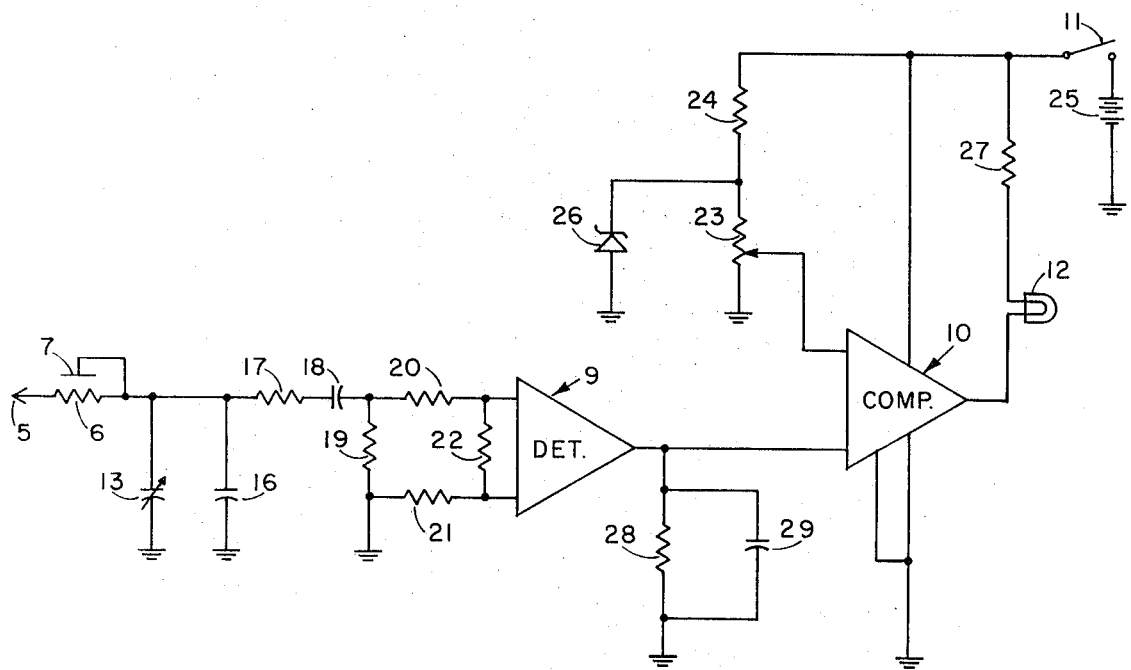

Other objects, advantages and novel features of the invention will become apparent from the following detailed description of the invention when considered in conjunction with the accompanying drawings wherein:

FIG. 1 shows the general appreearance of the apparatus and part of its interior construction; and FIG. 2 is a schematic diagram of the control circuit of the detector.

Referring now to FIG. 1 which shows the general overall appearance and part of the internal structure of the detector, it will be seen that the apparatus consists of a split metal casing 1 having a rectangular body portion 2 which fits in the palm of the operator's hand and a conical nose portion 3. A dielectric member 4 effectively closes the apex of conical nose portion 3 and provides support for a bullet shaped metallic contact probe 5 which is positioned along the central axis of the casing and extends outwardly a short distance therefrom. This contact probe, it would be pointed out, is the only part of the detector which comes in contact with the structure that is being tested.

Since the detector is designed to be firmly held in the bare unprotected hand of the operator, dielectric member 4 provides the necessary isolation against any dangerous voltage levels which may be present on the structure under test. Probe 5 at its rear face is connected to a resistor 6 of megohm magnitude, which gives the apparatus a high input impedance. The other side of this resistor is connected to the end closure wall of an inner metal sleeve 7 which surrounds this resistor with its open end embedded in the dielectric member 4 for support. This sleeve, which functions to establish a fixed value of capacitance across resistor 6, is adjustable only at assembly.

A transverse partition wall 8 subdivides the interior of the casing and effectively closes off the nose cone portion 3. However, an insulated conductor 14 passes through this wall and makes contact with metallic sleeve 7 at its end wall. This conductor connects with the other components of the system which include a diode detector and a voltage comparator, both of which are accommodated in the main body portion 2 of the apparatus.

A variable capacitor 13 is supported on the casing in a manner which permits its adjustment by external means. This capacitor is available for adjusting the voltage division across the input circuit to an accurate 100 : 1 stepdown ratio of any frequency in the range of 2 – 30 MHz that is irradiating the structure under test. Also secured to the outer side wall of the casing at a convenient and accessible location is a manually operated switch 11 which activates the detector. And, finally, an indicating lamp 12 is mounted on the back wall of the instrument at a location that is normally unobstructed by the operaor's hand. When illuminated, this lamp gives a warning that the radio frequency voltage exceeds a predetermined value and is, therefore, sufficiently high to be hazardous.

The instrument generally described above must be held in the bare hand since the operator serves as a low impedance path to ground for the RF energy. This allows the potential difference between the tester and the item under test to be measured. Because of this mode of operation, the tester is given a true measure of the hazard condition while at the same time being protected from any dangerous level voltage by the high impedance characteristic of the probe.

The complete circuit of the detector is illustrated in FIG. 2, and it will be seen that probe 5 and compensating resistor 6 are connected in series to a shunt variable capacitor 13 and a parallel fixed capacitor 16. The capacitance represented by the sleeve 7, resistor 6 and probe 5 combination is, consequently, in series with these capacitors to form a capacitive voltage divider. Both capacitors 13 and 16 of this divider are grounded by the operator when he holds the instrument in his bare hands. It will be recalled that capacitor 13 may be varied during the calibration operation to achieve an accurate 100 : 1 stepdown ratio of the radio frequency energy.

That portion of the input voltage which exists across capacitors 13 and 16 of the voltage divider is coupled by resistor 17 and series capacitor 18 to a constant impedance divider made up of resistors 19, 20, 21 and 22 in the input of a diode detection network 9. An RC circuit made up of resistor 28 and capacitor 29 serves as the load resistor and filter capacitor for this detector. The capacitor chosen for this circuit performs a dual function — first, it reduces the ripple in the output and, second, its magnitude is selected to be intentionally low to reflect an impedance that varies with frequency. Thus, its functions as a portion of the overall frequency/voltagge compensation. In this connection, it would be pointed out that the detector employs frequency, impedance and loading compensation to permit its operation over the frequency spectrum of, for example, 2 : 30 MHz.

Detector 9 provides one input to a voltage comparator 10 which has as its other input a reference DC voltage taken from the movable tap of potentiometer 23. This potentiometer and a series resistor 24 are connected between ground and the positive terminal of a DC voltage supply 25 through manually operated switch 11. Zener diode 26 insures that the voltage across the potentiometer remains constant at the voltage breakdown level of the diode and insensitive to changes in voltage source 25.

The indicator of the tester, lamp 12, is connected at one side to the output of the voltage comparator and at the other side by resistor 27 to the positive terminal of the voltage source 25 through manually operated switch 11. Comparator 10, it will be appreciated, provides a conducting path to ground for the lamp when the voltage input thereto exceeds that of the reference by 3 percent. In this connection, 140 volts of RF was considered as the "unsafe to touch" level. Resistor 27 reduces the total drain from the voltage supply and allows a lower voltage lamp to be used in the circuit.

In the operation of the circuit, whenever probe 5 makes contact with a metal structure which is being irradiated by radio frequency energy, a portion of this energy flows through resistor 5, capacitors 13 and 16 to ground via the operator who is grounding the casing of the instrument. Part of the voltage developed across these capacitors is applied to diode detector 9 and the DC signal resulting therefrom is compared to the reference value derived from potentiometer 23. If this pre-established reference value is exceeded, lamp 12 is energized and the operator is warned of the hazardous RF voltage level on the object under test.

The procedure for using the detector and the precautions which must be taken are as follows: The instrument should be held firmly in the bare hand, the power "on" button depressed and the device held so that the indicator lamp is observable. Then the probe should be placed on the metallic structure which is being tested, and several contact points should be tried for consistency of measurement.

Touching the probe to an insulated material may give an erroneous indication. It should be recognized also that the RF voltage induced by a particular radio frequency source may change if the frequency changes and/or the power output changes.

What is claimed is:

1. A hand-held device for testing for radio frequency voltage levels comprising
   a metallic casing adapted to be held in the hand of a tester;
   a conducting probe projecting from said casing and insulated therefrom;
   a high resistance having one end thereof connected to said metallic probe;
   a conducting sleeve disposed about and insulated from said resistor,
      said sleeve being closed off at one end with said closed off end being connected to the other end of resistance whereby said sleeve functions as a distributed capacitance across said resistor;
   a variable capacitor connected between the closed off end of said sleeve and said casing,
      said distributed capacitance and said variable capacitor forming aa voltage divider such that whenever said casing is held in the bare hand of a tester and said probe brought in contact with an isolated conducting object that is being irradiated with radio frequency energy, said radio frequency energy flows to ground through said voltage divider and said tester;
   means disposed within said casing for developing a signal indicative of the magnitude of said radio frequency flow;
   means for comparing said signal with a predetermined reference voltage;
   a light source supported by said casing; and
   means for operating said light source whenever said signal exceeds said reference voltage by a predetermined amount.

2. In an arrangement as defined in claim 1 wherein said variable capacitor is mounted on said casing such that it can be varied by said tester to track the frequency of the particular radio frequency energy irradiating said object.

3. In an arrangement as defined in claim 1 wherein said metallic casing has an apex portion and said conducting probe extends from said apex portion.

4. A hand-held instrument for determining whether an object is at a dangerously high induced radio frequency voltage comprising, in combination
   a metallic casing adapted to be held in the hand of a tester,
      said casing having a generally rectangular body portion and a frustro-conical nose portion;
   a di-electric member having a blunted conical shape closing the apex of said frustro-conical nose portion;
   a metallic contact probe projecting from said di-electric member and supported therefrom;
   a high impedance means connected between said probe and said casing,
      said high impedance means comprising a high ohmage resistor, a distributed capacitance existing across said resistor and a manually adjustable capacitor connected in series with said resistor,
      said distributed capacitance and said adjustable capacitor performing as a capacitance voltage divider whereby whenever said casing is held in the bare hand of said tester and said probe brought into contact with a conducting object that is being irradiated with radio frequency energy, radio frequency energy will flow to ground through said tester and charge said adjustable capacitor to a voltage level determined by the voltage condition of said conducting object;
   means for detecting the voltage level developed across said capacitor; and
   means for comparing said voltage level with a preset level and for providing a visual indication whenever said voltage level exceeds said preset level.

* * * * *